(12) United States Patent
Hedtke (10) Patent No.: US 9,057,659 B2
(45) Date of Patent: Jun. 16, 2015

(54) PRESSURE TRANSMITTER WITH HYDROGEN GETTER

(75) Inventor: Robert C. Hedtke, Young America, MN (US)

(73) Assignee: Rosemount Inc., Chanhassen, MN (US)

( * ) Notice: Subject to any disclaimer, the term of this patent is extended or adjusted under 35 U.S.C. 154(b) by 264 days.

(21) Appl. No.: 13/477,418

(22) Filed: May 22, 2012

(65) Prior Publication Data

US 2013/0312531 A1 Nov. 28, 2013

(51) Int. Cl.
*G01L 7/08* (2006.01)
*G01L 19/06* (2006.01)

(52) U.S. Cl.
CPC .................................. *G01L 19/0645* (2013.01)

(58) Field of Classification Search
USPC ..................................................... 73/715, 706
See application file for complete search history.

(56) References Cited

U.S. PATENT DOCUMENTS

| | | | |
|---|---|---|---|
| 3,942,546 A | 3/1976 | Radd et al. | |
| 5,257,542 A | 11/1993 | Voss | |
| 5,837,158 A * | 11/1998 | Shepodd et al. | 252/181.6 |
| 5,939,639 A * | 8/1999 | Lethbridge | 73/724 |
| 6,063,307 A | 5/2000 | Shepodd et al. | |
| 6,295,875 B1 | 10/2001 | Frick et al. | |
| 6,404,961 B1 * | 6/2002 | Bonja et al. | 385/109 |
| 6,568,274 B1 | 5/2003 | Lucas et al. | |
| 6,690,866 B2 | 2/2004 | Bonja et al. | |
| 7,290,452 B2 | 11/2007 | Hedtke | |
| 7,389,697 B2 * | 6/2008 | Jonsson | 73/724 |
| 8,234,927 B2 | 8/2012 | Schulte et al. | |
| 8,578,783 B2 | 11/2013 | Hedtke et al. | |
| 2005/0126296 A1 * | 6/2005 | Hedtke | 73/706 |
| 2006/0248958 A1 * | 11/2006 | Betzner | 73/754 |
| 2008/0202211 A1 * | 8/2008 | Wetzig | 73/40.7 |
| 2010/0281994 A1 * | 11/2010 | Brown et al. | 73/729.1 |
| 2013/0312531 A1 | 11/2013 | Hedtke | |

FOREIGN PATENT DOCUMENTS

| | | |
|---|---|---|
| CN | 1654831 A | 8/2005 |
| CN | 1317102 A | 10/2010 |
| CN | 102279075 A | 12/2011 |
| CN | 202582821 U | 12/2012 |
| CN | 202938959 U | 5/2013 |
| DE | 2901636 | 1/1979 |

(Continued)

OTHER PUBLICATIONS

Chinese Office Action from Application No. CN 201220470642.4, dated Dec. 27, 2012.

(Continued)

*Primary Examiner* — Hezron E Williams
*Assistant Examiner* — Xin Zhong
(74) *Attorney, Agent, or Firm* — Westman, Champlin & Koehler, P.A.

(57) ABSTRACT

A process variable transmitter for measuring a pressure of a process fluid includes a sensor module, a pressure inlet formed in the sensor module, an isolation diaphragm positioned in the pressure inlet, a pressure sensor and an isolation tube containing a fill fluid to convey a process fluid related pressure from the isolation diaphragm to the pressure sensor. A hydrogen getter material is positioned in contact with the fill fluid between the isolation diaphragm and the pressure sensor to remove hydrogen from the fill fluid.

14 Claims, 8 Drawing Sheets

(56) References Cited

FOREIGN PATENT DOCUMENTS

| EP | 0695418 | 4/1994 |
|---|---|---|
| EP | 1722209 | 11/2006 |

OTHER PUBLICATIONS

Office Action from Chinese Patent application No. CN 201210341974.7, dated Nov. 4, 2014.
The German Patent and Trademark Office, Office Action from application No. 10 2004 060 647.1, filed Dec. 16, 2004.
Heise HPO Precision Pressure Transducers and Transmitters, Heise, 1997.
New HPO Precision Pressure Transducers, Heise.
The Chinese Patent and Trademark Office Action from application No. 200410081905.2, filed Dec. 16, 2003.
Notification of Transmittal of the International Search Report and the Written Opinion of the International Searching Authority dated Jun. 14, 2013 in International Application No. PCT/US2013/030399, filed Mar. 12, 2013.

* cited by examiner

PRESSURE TRANSMITTER WITH HYDROGEN GETTER

BACKGROUND OF THE INVENTION

The present invention relates to pressure transmitters for measuring pressures of process fluids in industrial processes. More specifically, the present invention relates to reducing adverse effects of hydrogen on performance of pressure transmitters.

Process pressure transmitters are used in a variety of applications to sense pressure (absolute, gage, or differential) within a process environment. Additionally, a process pressure transmitter can be used to sense differential pressure from two distinct points, such as at varying elevations along a tank and provide an indication of a fluid level within the tank. In some configurations, a thin, flexible isolation diaphragm and fill fluid separate the pressure sensitive element of the pressure transmitter from the process fluid. When process pressure is applied, the diaphragm of the pressure transmitter is displaced. This displacement is related to the process pressure and is converted electronically to an appropriate current, voltage, or digital output signal such as HART® (Highway Addressable Remote Transducer).

In order to ensure that the pressure sensed within the pressure transmitter is an accurate representation of the process pressure, it is important that the fill fluid be incompressible. While this may seem to be a relatively straight forward design criterion, it is known that certain types of oils will, over time, outgas or develop bubbles therein. Typically, these issues are addressed by selecting very high quality fill fluids; pre-processing the fill fluid to decrease the extent to which it may outgas over time; and through other relatively high cost techniques. Despite the various steps taken to reduce outgassing and the resulting effects, which increase the manufacturing costs of a pressure transmitter, adverse effects of gases in the fill fluid remain an issue in pressure transmitters.

One source of gas in pressure transmitter fill fluid is hydrogen atoms which permeate the isolation diaphragm. In all crystals, some of the lattice sites are unoccupied. These unoccupied sites are called vacancies. If one of the atoms on an adjacent site jumps into the vacancy, the atom is said to have diffused by a vacancy mechanism. This type of diffusion allows hydrogen atoms to permeate the isolation diaphragm. Because transmitter diaphragms are very thin, hydrogen atoms permeating through the diaphragm can unite to form molecular hydrogen. Because molecular hydrogen is too large to permeate back through the diaphragm, it gets trapped and forms bubbles in the fill fluid. These bubbles can severely affect transmitter performance.

In order to reduce the effects of hydrogen gas on pressure transmitter performance, care typically must be taken to prevent placing certain dissimilar metals in close proximity where atomic hydrogen could be generated. Positioning cadmium or cadmium-plated parts near high-nickel alloys, such as SST or Alloy C-276, in the presence of an electrolyte such as water, can result in the creation of a Ni Cad battery effect where atomic hydrogen is released. This atomic hydrogen can then permeate a thin diaphragm. In general, in applications where atomic hydrogen is present, materials that are not susceptible to permeation should be chosen. Metals that contain a lot of nickel are more susceptible to permeation. Increased temperatures also increase the rate of permeation.

Plating certain alloys common to pressure transmitters, such as Alloy-400, with gold provides protection against hydrogen permeation while providing the corrosion resistance of Alloy-400. However, with rising costs associated with gold, this technique for reducing hydrogen permeation can add significantly to the costs of manufacturing pressure transmitters.

As discussed above, in addition to hydrogen permeation, hydrogen can also form bubbles due to out-gassing from the SST casting. This can be a serious problem when module castings are not annealed. It also is a problem for high temperature, high vacuum applications. A common solution to out-gassing is to bake out the transmitter parts. This adds cost, but more importantly, the bake out time becomes a judgment. Hydrogen will out-gas forever so the bake out is ideally done only long enough such that any further out-gassing will not significantly affect performance. However, determining the proper bake out time can be difficult.

The discussion above is merely provided for general background information and is not intended to be used as an aid in determining the scope of any claimed subject matter.

SUMMARY OF THE INVENTION

A process variable transmitter for measuring a pressure of a process fluid includes a sensor module, a pressure inlet formed in the sensor module, an isolation diaphragm positioned in the pressure inlet, a pressure sensor and an isolation tube containing a fill fluid to convey a process fluid related pressure from the isolation diaphragm to the pressure sensor. A hydrogen getter material is positioned in contact with the fill fluid between the isolation diaphragm and the pressure sensor to remove hydrogen from the fill fluid.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of any claimed subject matter.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In various disclosed embodiments, a hydrogen getter is added to a process pressure transmitter on a fill fluid side of the transmitter's isolation diaphragm. As used herein, a getter or getter material is intended to mean any structure or substance that has the ability to immobilize, absorb, or otherwise remove gaseous hydrogen from the fill fluid. While various getter materials in different forms can be used, in exemplary embodiments polymer hydrogen getters, for example those commercially available from Vacuum Energy Inc. are contemplated in some embodiments for reasons of compatibility with pressure transmitter fill fluid. Other examples of known polymeric getters are disclosed in U.S. Pat. Nos. 5,837,158 and 6,063,307. In the various embodiments, placement of hydrogen getter material allows the costs of manufacturing the process pressure transmitter to be reduced in some cases by eliminating the costly gold plating which has commonly been used. In these or other instances, the disclosed embodiments provide the potential for better performing or more durable process pressure transmitters in that detrimental effect of hydrogen gas is reduced or eliminated.

Figure 1:
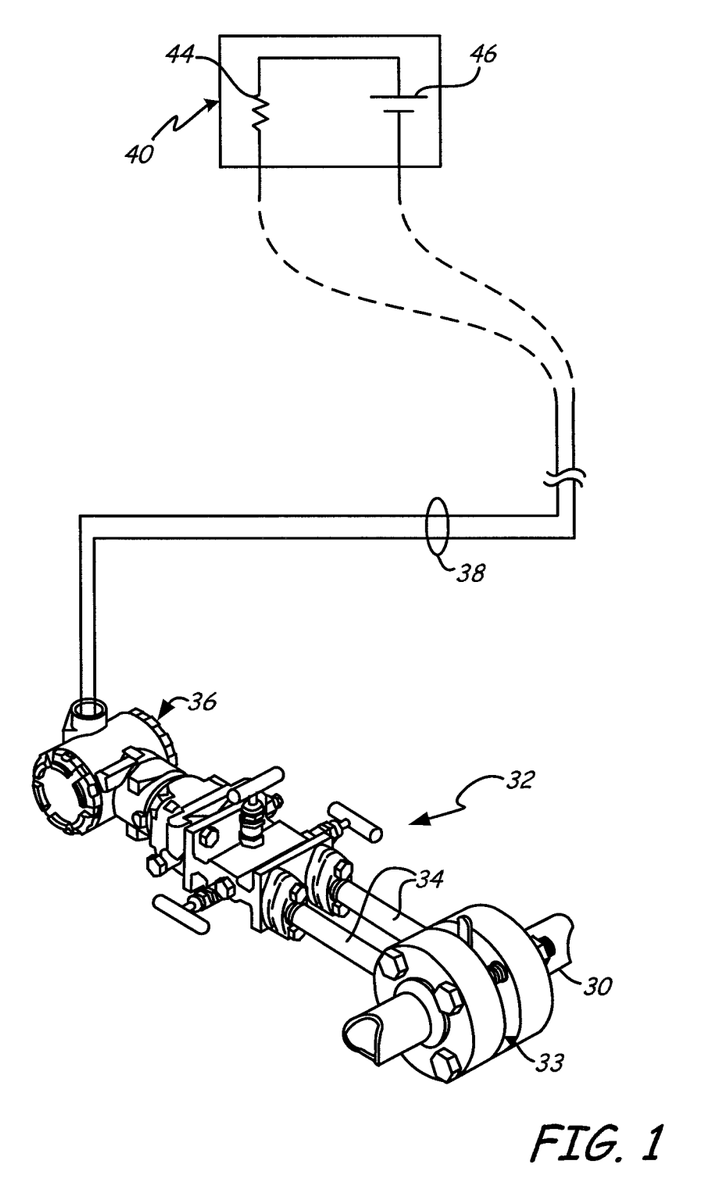
FIG. 1 shows a process measurement system with a process transmitter constructed in accordance with an example embodiment.

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it flows past the primary element 33.

Transmitter 36 is a process measurement device that receives process pressures through the impulse piping 34. The transmitter 36 senses a differential process pressure and converts it to a standardized transmission signal that is a function of the process pressure. While an illustrative embodiment is described with reference to transmitter 36 measuring differential process pressure, disclosed embodiments are not limited to transmitters that measure differential pressure. Pressure transmitter 36 can thus be considered to be a process pressure transmitter of any type having an isolation diaphragm and a fluid fill system.

A process loop 38 provides both a power signal to the transmitter 36 from control room 40 and bi-directional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A control room 40 includes a voltage power supply 46 that powers the transmitter 36 and a series resistance 44. In another example configuration, loop 38 is a wireless connection in which data may be transmitted or received wirelessly either in a point-to-point configuration, a mesh network, or other configuration.

Figure 2:
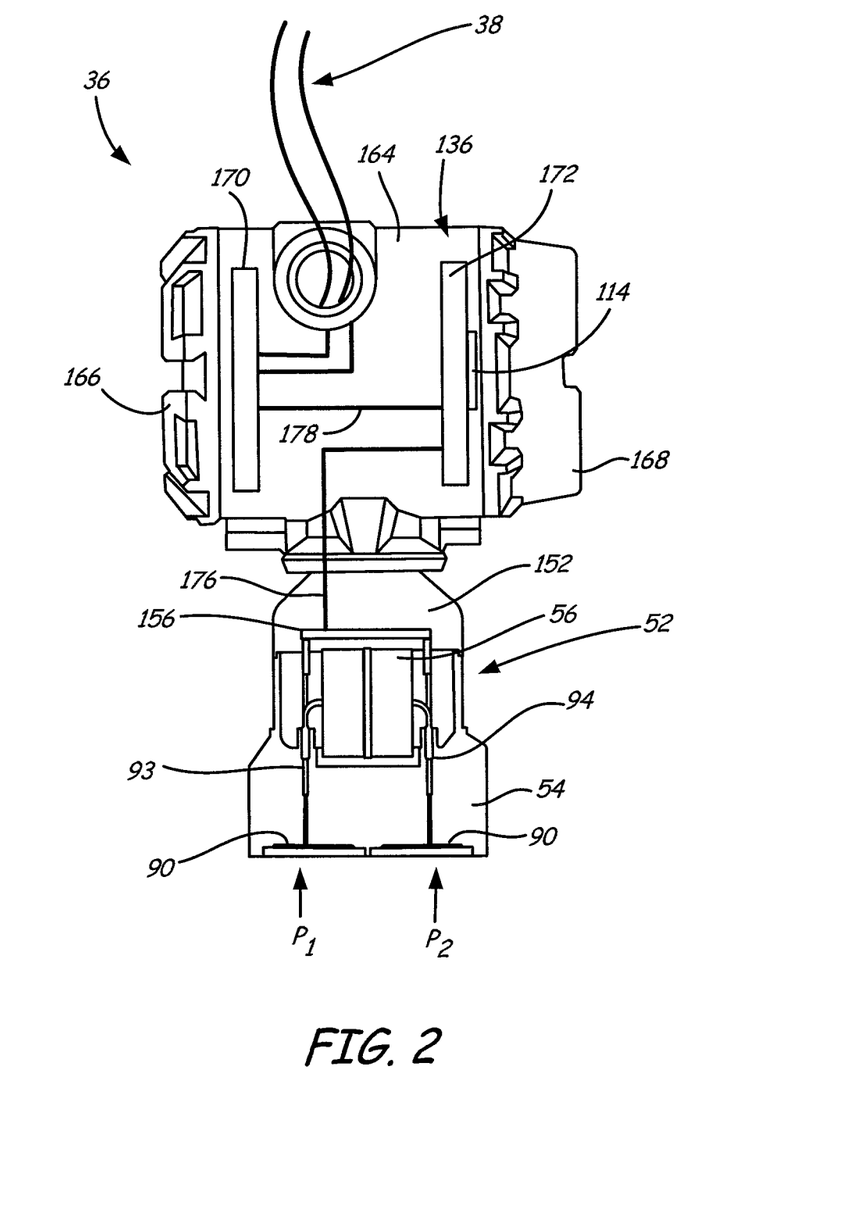
FIG. 2 is a schematic side view of the process transmitter of FIG. 1 showing transmitter features.

FIG. 2 schematically shows one embodiment of pressure transmitter 36 having a sensor module 52 and a transmitter electronics module 136. Sensor module 52 includes housing 152 and a base 54, in which are disposed a sensor board 156, a pressure sensor 56, isolation tubes 93 and 94 and sensing or isolation diaphragms 90. Transmitter electronics module 136 includes a housing 164, a cover 166, a display cover 168, an output interface 170 and transmitter circuitry 172. Pressures $P_1$ and $P_2$ are produced on either side of primary element 33 in piping 30 shown in FIG. 1.

Sensor board 156 and sensor 56 are mounted within housing 152 of sensor module 52. Housing 152 of sensor module 52 connects to housing 164 of electronics module 136 through, for example, a threaded connection. Similarly, covers 166 and 168 are connected to housing 164 through threaded connections that form flame-quenching seals, as are known in the art, to prevent escape of flames from within housing 164. Output interface 170 and transmitter circuitry 172 are mounted to housing 164 within transmitter electronics module 136 and can together form one or more electronics boards.

In the illustrated embodiment, sensor 56 is a capacitance-based differential pressure cell having a sensing diaphragm disposed between a pair of electrode plates. In one embodiment, sensor 56 is a metal-diaphragm type sensor as is described in U.S. Pat. No. 6,295,875 to Frick et al., which is assigned to Rosemount Inc., Eden Prairie, Minn. Sensor 56 is connected to base 54 with isolation tubes 93 and 94, in which is disposed a hydraulic fill fluid. Isolation diaphragms 90 separate the fill fluid within isolation tubes 93 and 94 from pressures $P_1$ and $P_2$ of process fluid. Changes in pressures $P_1$ and $P_2$ of process fluid are sensed as differential pressure $\Delta P$ by sensor 56 through isolation diaphragms 90 within base 54 and the hydraulic fill fluid within isolation tubes 93 and 94. However, as described above, disclosed embodiments are not limited to this differential pressure measurement configuration.

Figure 3:
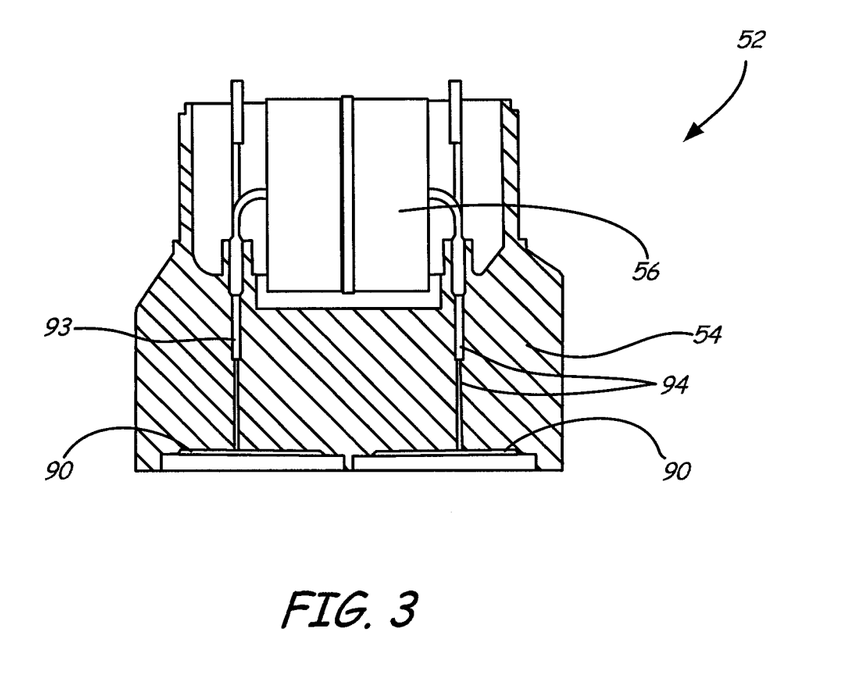
FIG. 3 is a cross sectional view of a sensor module of the transmitter of FIG. 2.

FIG. 3 is a cross sectional view of sensor module 52 shown in greater detail. As illustrated in FIG. 3, isolation tube 93 through base 54 couples to the differential pressure sensor 56. Similarly, isolation tube 94 through base 54 also connects to differential pressure sensor 56. In disclosed embodiments, a solution to the formation of hydrogen bubbles utilizes the addition of a hydrogen getter, or hydrogen getter material, at one or more locations inside the oil filled system of the pressure transmitter. Eliminating hydrogen caused by permeation can improve pressure transmitter performance and durability, and can potentially eliminate the costly gold plating which is sometimes used to reduce hydrogen gas build-up. In disclosed embodiments, hydrogen is allowed to permeate through the isolation diaphragm 90, but is then absorbed from the fill fluid between the isolation diaphragm and the pressure sensor 56. For hydrogen caused by out-gassing the getter can also eliminate or reduce the extent of a bake out.

Figure 4:
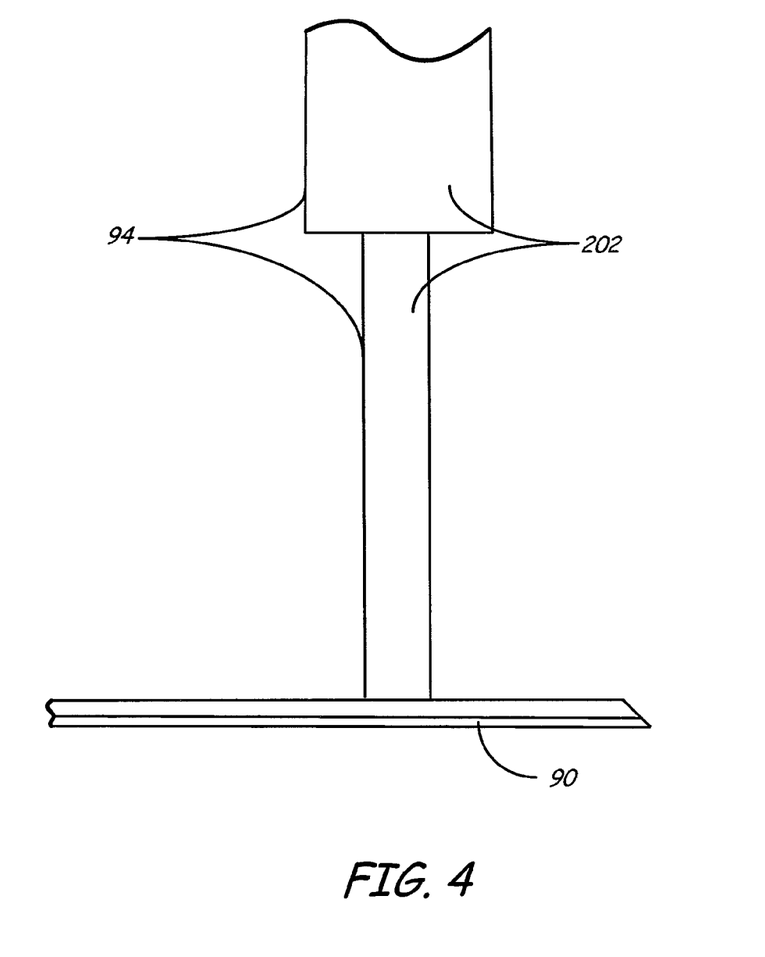
FIG. 4 is a diagrammatic illustration of isolation tube portions of the sensor module, showing first embodiments with hydrogen getter material mixed with fill fluid.

Referring to FIG. 4, shown is a portion of sensor module in accordance with first embodiments. Portions of isolation tube 94 and isolation diaphragm 90 are shown. It should be understood that isolation tube 93 and the corresponding isolation diaphragm 90 can be identical to tube 94 and the illustrated diaphragm 90, and the following description can be applied to both isolation tubes.

In the embodiment illustrated in FIG. 4, isolation tube 94 is filled with fill fluid 202 including silicone oil mixed with a getter material. In this embodiment, the fill fluid 202 itself contains the hydrogen getter material to remove hydrogen gas from the closed system. In one example of such an embodiment, a high viscosity liquid or gel polymer getter material, such as those commercially available from Vacuum Energy Inc., is mixed with silicone oil fill fluid to form hydrogen getter fill fluid 202. In other embodiments, a fine powder getter material is mixed with and dispersed throughout the silicone oil to form hydrogen getter fill fluid 202. While fill fluid 202 is described as being positioned within isolation tube 94, portions of the fluid 202 will be outside of tube 94 and in contact with isolation diaphragm 90. One benefit of this approach is that the getter material can absorb hydrogen from any point in the oil filled system. However, since silicone oil is immiscible with most additives, this solution may not be preferred in some cases. Further, in addition to potentially adversely affecting the performance of the silicone oil, other factors such as dielectric constant, dielectric stability, and temperature effect, may be adversely affected.

Figure 5:
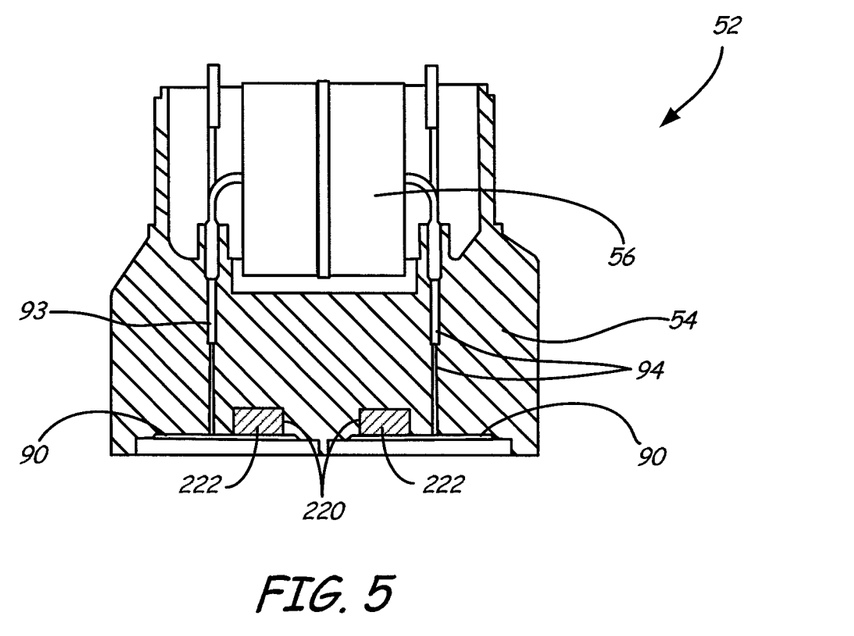
FIG. 5 is a diagrammatic illustration of portions of the sensor module, showing second embodiments with hydrogen getter material positioned in contact with the fill fluid near the isolation diaphragm.
Figure 6:
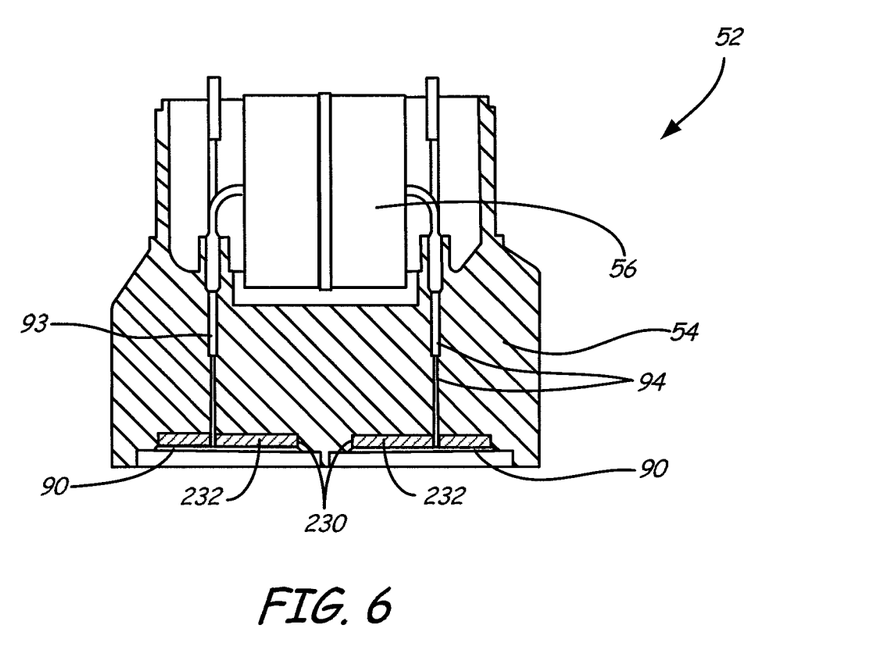
FIG. 6 is a diagrammatic illustration of portions of the sensor module, showing third embodiments with hydrogen getter material positioned in contact with the fill fluid near the isolation diaphragm.

Referring now to FIG. 5, shown is an alternate embodiment in which getter material is added as a separate solid piece 222 adjacent isolation diaphragm 90 and in contact with the oil volume. In one example embodiment, getter material 222 is deposited or inserted into a cavity or recess 220 formed in the material of base 54 adjacent the isolation diaphragm. While illustrated as a rectangular shaped piece of getter material 222 positioned in a rectangular recess 220, the getter material and/or recess can be of various sizes and geometries. For example, FIG. 6 illustrates getter material 232 positioned within a recess 230 such that it is formed on both sides of isolation tube 94 and substantially over the area of isolation diaphragm 90. Further, getter material 222 need not be positioned within a recess. Instead, in some embodiments, getter material is deposited on, or adhered or fastened to, a surface of base 54 in contact with the oil volume between isolation diaphragm 90 and sensor 56.

Figure 7:
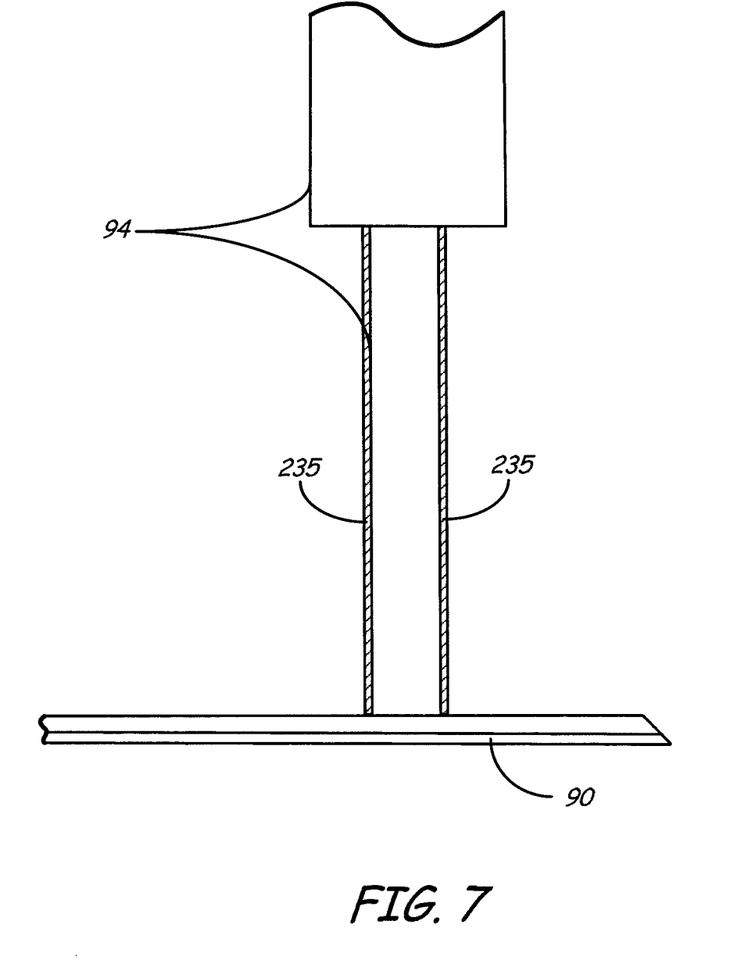
FIG. 7 is a diagrammatic illustration of portions of the sensor module, showing fourth embodiments with hydrogen getter material positioned in the isolation tube region.

Referring now to FIG. 7, shown is an embodiment in which getter material 235 is deposited or formed on isolation tube 94. For example, getter material 235 can be in the form of a thin film getter material coated or deposited on isolation tube 94 such that it directly contacts the fill fluid within tube 94. Isolation tube 93 can similarly include getter material 235.

Figure 8:
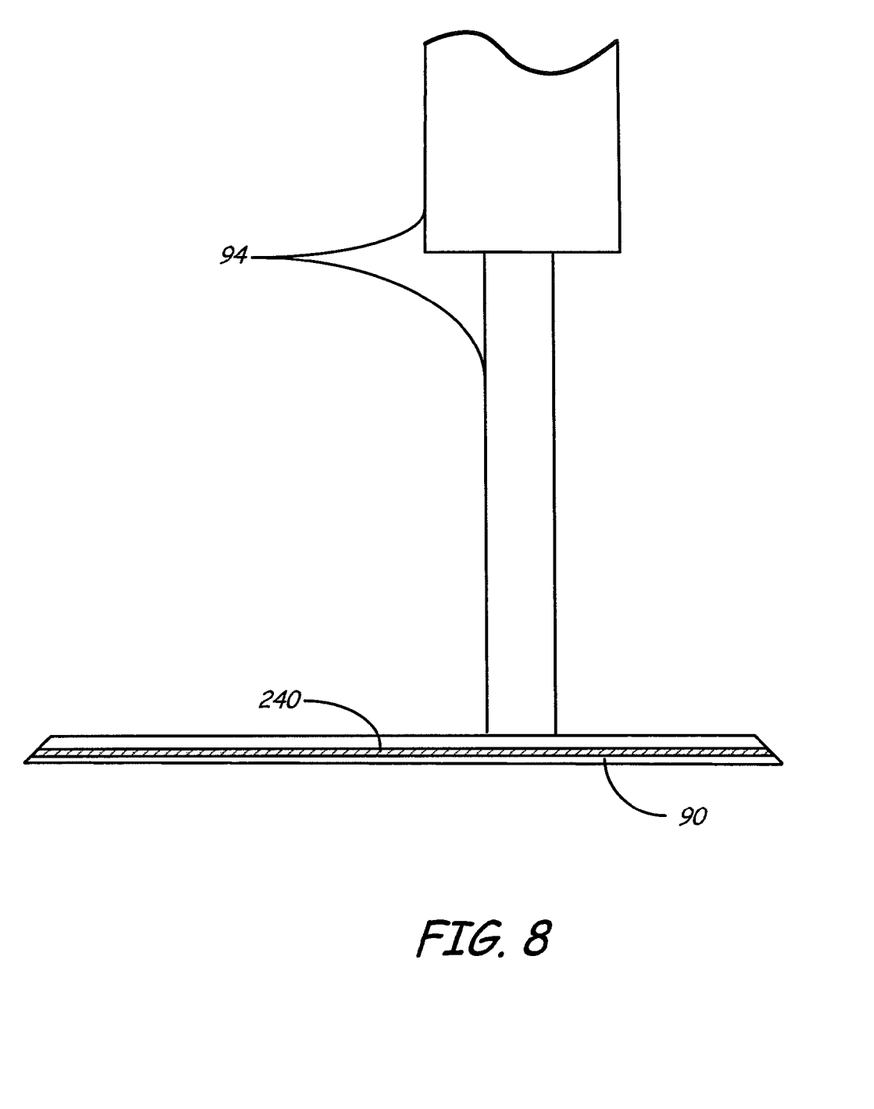
FIG. 8 is a diagrammatic illustration of portions of the sensor module, showing fifth embodiments with hydrogen getter material coated on the isolation diaphragm.

Referring now to FIG. 8, shown is another embodiment in which getter material 240 is coated on a backside (the side in contact with the fill fluid) of the isolation diaphragm 90. For example, getter material 240 can be a thin film getter material of low enough thickness so as to not interfere with the transfer of pressure across diaphragm 90. One potential advantage of this embodiment is that the addition of the getter material to the diaphragm segregates the option to the diaphragm selection. Thus, other design aspects are not affected. Embodiments which coat getter material 240 on isolation diaphragm 90 can include coatings which cover substantially the entire diaphragm, and coatings which cover only one or more sections of the diaphragm but leave other sections of the diaphragm uncoated.

Although the present invention has been described with reference to preferred embodiments, workers skilled in the art will recognize that changes may be made in form and detail without departing from the spirit and scope of the invention.

What is claimed is:

1. A process variable transmitter for measuring a pressure of a process fluid comprising:
   a sensor module having a housing and a base;
   at least one pressure inlet formed in the base of the sensor module and coupleable to a process fluid related pressure;
   an isolation diaphragm positioned at the at least one pressure inlet in the base;
   a pressure sensor spaced apart from the isolation diaphragm;
   an isolation tube extending through the base and containing a fill fluid to convey the process fluid related pressure from the isolation diaphragm to the pressure sensor; and
   hydrogen getter material positioned in contact with the fill fluid in the base between the isolation diaphragm and the pressure sensor to remove hydrogen from the fill fluid, wherein the hydrogen getter material comprises a coating on the isolation diaphragm.

2. The process variable transmitter of claim 1, wherein the hydrogen getter material further comprises hydrogen getter material mixed with the fill fluid.

3. The process variable transmitter of claim 2, wherein the fill fluid comprises silicone oil.

4. The process variable transmitter of claim 3, wherein the hydrogen getter material mixed with the fill fluid comprises a high viscosity liquid or gel polymer getter material.

5. The process variable transmitter of claim 3, wherein the hydrogen getter material mixed with the fill fluid comprises a powder getter material mixed with the silicone oil.

6. The process variable transmitter of claim 1, wherein the hydrogen getter material further comprises a separate solid piece of getter material in contact with the fill fluid.

7. The process variable transmitter of claim 6, wherein the separate solid piece of getter material is positioned adjacent to the isolation diaphragm.

8. The process variable transmitter of claim 7, wherein the sensor module further comprises a recess positioned to hold the separate solid piece of getter material adjacent to the isolation diaphragm.

9. The process variable transmitter of claim 1, wherein the hydrogen getter material further comprises hydrogen getter material positioned in the isolation tube in contact with the fill fluid.

10. The process variable transmitter of claim 9, wherein the hydrogen getter material positioned in the isolation tube is a thin film getter material formed in the isolation tube.

11. A method of maintaining a fill fluid in a process variable transmitter having a sensor module, a pressure inlet formed in the sensor module, an isolation diaphragm positioned in the pressure inlet, a pressure sensor and an isolation tube containing a fill fluid to convey a process fluid related pressure from the isolation diaphragm to the pressure sensor, the method comprising: placing a hydrogen getter material in the sensor module in contact with the fill fluid between the isolation diaphragm and the pressure sensor to remove hydrogen from the fill fluid, wherein placing the hydrogen getter material in the sensor module in contact with the fill fluid further comprises at least one of coating the isolation diaphragm with the hydrogen getter material and coating an interior of the isolation tube with the hydrogen getter material.

12. The method of claim 11, wherein placing the hydrogen getter material in the sensor module in contact with the fill fluid further comprises positioning a separate solid piece of getter material in contact with the fill fluid.

13. The method of claim 12, wherein positioning the separate solid piece of getter material in contact with the fill fluid further comprises positioning the separate solid piece of getter material in the sensor module adjacent the isolation diaphragm.

14. The method of claim 11, wherein placing the hydrogen getter material in the sensor module in contact with the fill fluid further comprises mixing the hydrogen getter material with the fill fluid.

* * * * *